US010896037B2

(12) United States Patent
Gupta et al.

(10) Patent No.: US 10,896,037 B2
(45) Date of Patent: Jan. 19, 2021

(54) METHOD AND APPARATUS FOR OPEN SOURCE ANALYTICS FOR INFORMATION HANDLING SYSTEMS

(71) Applicant: DELL PRODUCTS, LP, Round Rock, TX (US)

(72) Inventors: Chitrak Gupta, Bangalore (IN); Mainak Roy, Bangalore (IN); Swapna M, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 161 days.

(21) Appl. No.: 16/057,078

(22) Filed: Aug. 7, 2018

(65) Prior Publication Data

US 2020/0050448 A1 Feb. 13, 2020

(51) Int. Cl.
| | |
|---|---|
| *G06F 8/71* | (2018.01) |
| *G06F 16/22* | (2019.01) |
| *G06F 16/2455* | (2019.01) |
| *G06F 16/2457* | (2019.01) |
| *G06F 21/57* | (2013.01) |
| *G06F 21/50* | (2013.01) |

(52) U.S. Cl.
CPC ............ *G06F 8/71* (2013.01); *G06F 16/2228* (2019.01); *G06F 16/2455* (2019.01); *G06F 16/24578* (2019.01); *G06F 21/50* (2013.01); *G06F 21/57* (2013.01); *G06F 2201/835* (2013.01); *G06F 2201/86* (2013.01); *G06F 2201/865* (2013.01)

(58) Field of Classification Search
CPC .... G06F 16/24578; G06F 16/22; G06F 16/31; G06Q 30/0282
See application file for complete search history.

(56) References Cited

U.S. PATENT DOCUMENTS

| | | | | |
|---|---|---|---|---|
| 5,731,991 | A | * | 3/1998 | Kinra .................. G06F 11/3452 700/182 |
| 8,356,278 | B2 | * | 1/2013 | Drissi ....................... G06F 8/36 717/101 |
| 8,832,647 | B2 | * | 9/2014 | Cope ......................... G06F 8/61 717/120 |
| 10,110,486 | B1 | * | 10/2018 | Anderson ............... H04L 45/74 |
| 2011/0106817 | A1 | * | 5/2011 | Pan ........................ G06Q 30/02 707/748 |
| 2012/0124547 | A1 | * | 5/2012 | Halbedel ............... G06F 16/903 717/100 |

(Continued)

OTHER PUBLICATIONS

Willis, Nathan, "OpenBMC, a distribution for baseboard management controllers," 2016, Eklektix, Inc., pp. 1-8 downloaded at https://lwn.net/Articles/683320/.

*Primary Examiner* — Lewis A Bullock, Jr.
*Assistant Examiner* — Theodore E Hebert
(74) *Attorney, Agent, or Firm* — Larson Newman, LLP

(57) ABSTRACT

A system includes a processor that queries a data source to retrieve electronic data describing a version of an open source software program, and generates an open source stability index based on the electronic data describing the version of the open source software program. The processor also generates an open source security index based on the electronic data describing the version of the open source software program, and generates a ranking of the version of the open source software program based on the open source stability index and on the open source security index.

18 Claims, 10 Drawing Sheets

(56) References Cited

U.S. PATENT DOCUMENTS

| | | | |
|---|---|---|---|
| 2013/0067427 A1* | 3/2013 | Fox | G06F 9/44 |
| | | | 717/101 |
| 2014/0289159 A1* | 9/2014 | Das | G06Q 30/0282 |
| | | | 705/347 |
| 2015/0020061 A1* | 1/2015 | Ravi | G06F 8/65 |
| | | | 717/172 |
| 2016/0275116 A1* | 9/2016 | Shi | G06F 8/75 |
| 2017/0046458 A1* | 2/2017 | Meagher | H02J 13/00001 |
| 2017/0186058 A1* | 6/2017 | Hare | G06Q 30/0601 |
| 2018/0143891 A1* | 5/2018 | Polisetty | G06F 3/04817 |

* cited by examiner

| Product (internal code name/project) | Component (Name of code component) | Version of Code Component | Deployment Model (internal, external, client, server, etc.) | License (identity and location of license that applies to code component) | Stability Index | Security Index | Time from Last Version | Sentiment Scale |
|---|---|---|---|---|---|---|---|---|
| iDRAC9 | apache2 | 2.4.10 | External | Apache-2.0 | 75 | 40 | 0.5 | -7 |
| iDRAC9 | apr | 1.5.2 | External | Apache-2.0 | 65 | 80 | 1 | 5 |
| iDRAC9 | apr-util | 1.5.4 | External | Apache-2.0 | 55 | 80 | 0.75 | 7 |
| iDRAC9 | argtable | 2.13 | External | LGPLv2 | 55 | 90 | 0.5 | -3 |
| iDRAC9 | avahi | 0.6.31 | External | GPLv2+ LGPLv2.1+ | 40 | 90 | 0.5 | 2 |

METHOD AND APPARATUS FOR OPEN SOURCE ANALYTICS FOR INFORMATION HANDLING SYSTEMS

FIELD OF THE DISCLOSURE

The present disclosure generally relates to information handling systems, and more particularly relates to data analytics for evaluating open source programming components.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Open source software programs may be evaluated for security, stability, and social acceptance. Because many vendors and developers may offer many different open source software programs, and different versions of each, there will be performance, security, and stability differences. The Internet and intranets may thus be canvassed to obtain electronic data describing each different version. The electronic data may then be analyzed to determine a preferred version that satisfies a goal or strategy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 9 illustrates the ranking of different versions of the open source software program, according to exemplary embodiments.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
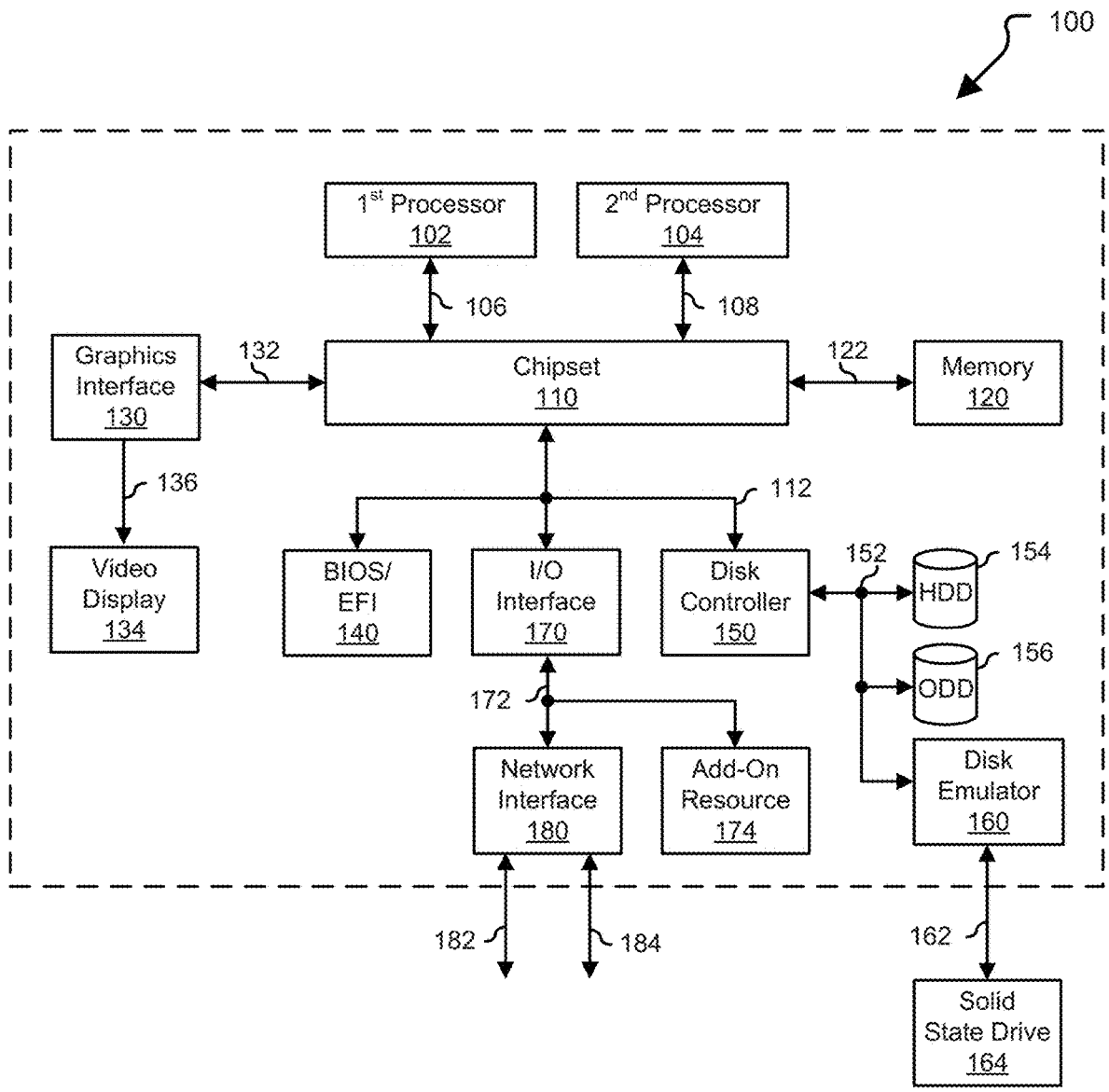
FIG. 1 is a block diagram illustrating an information handling system according to an embodiment of the present disclosure.

FIG. 1 illustrates a generalized embodiment of information handling system 100. Information handling system 100 has processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
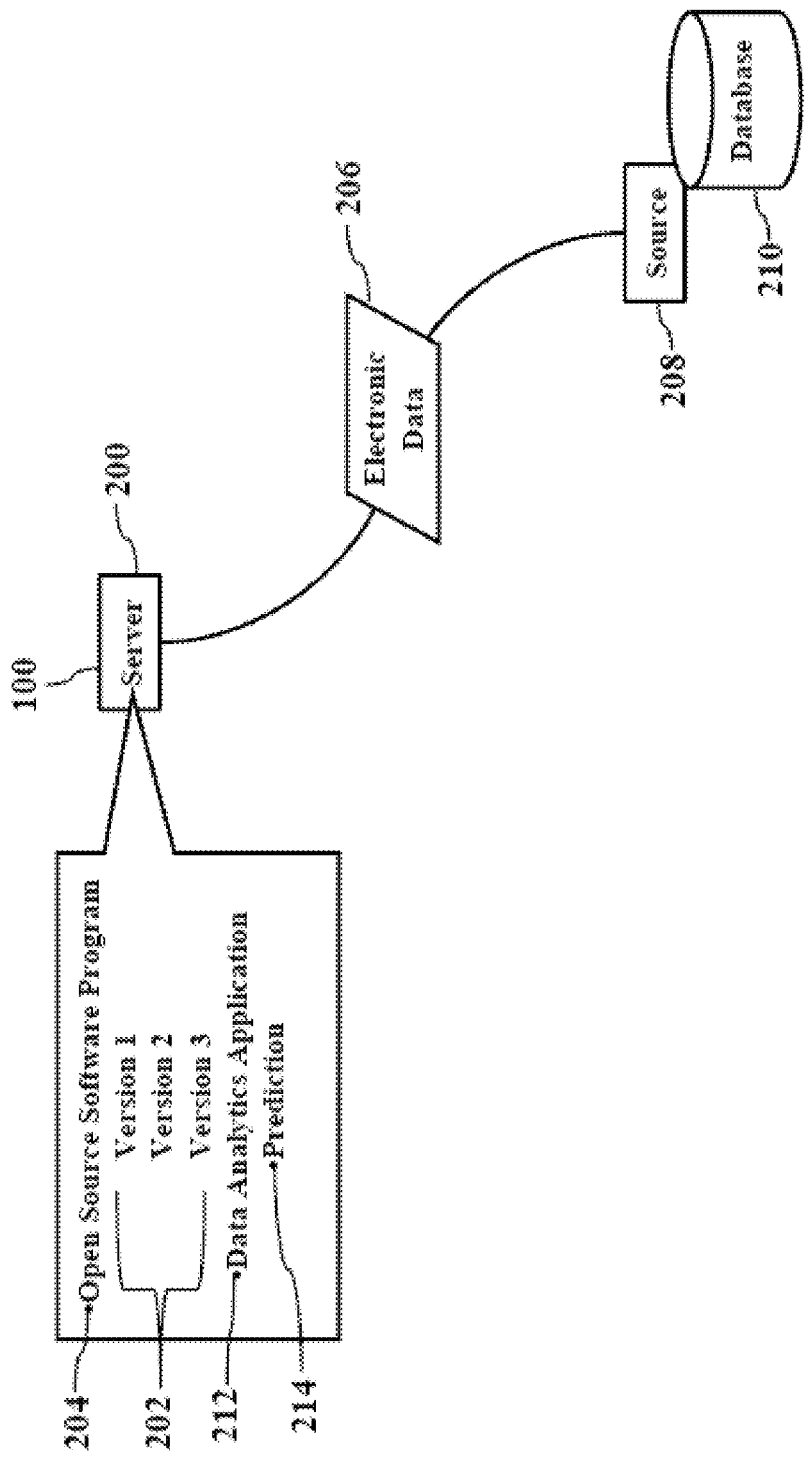
FIGS. 2-3 are simplified illustrations of open source evaluations, according to exemplary embodiments.
Figure 3:
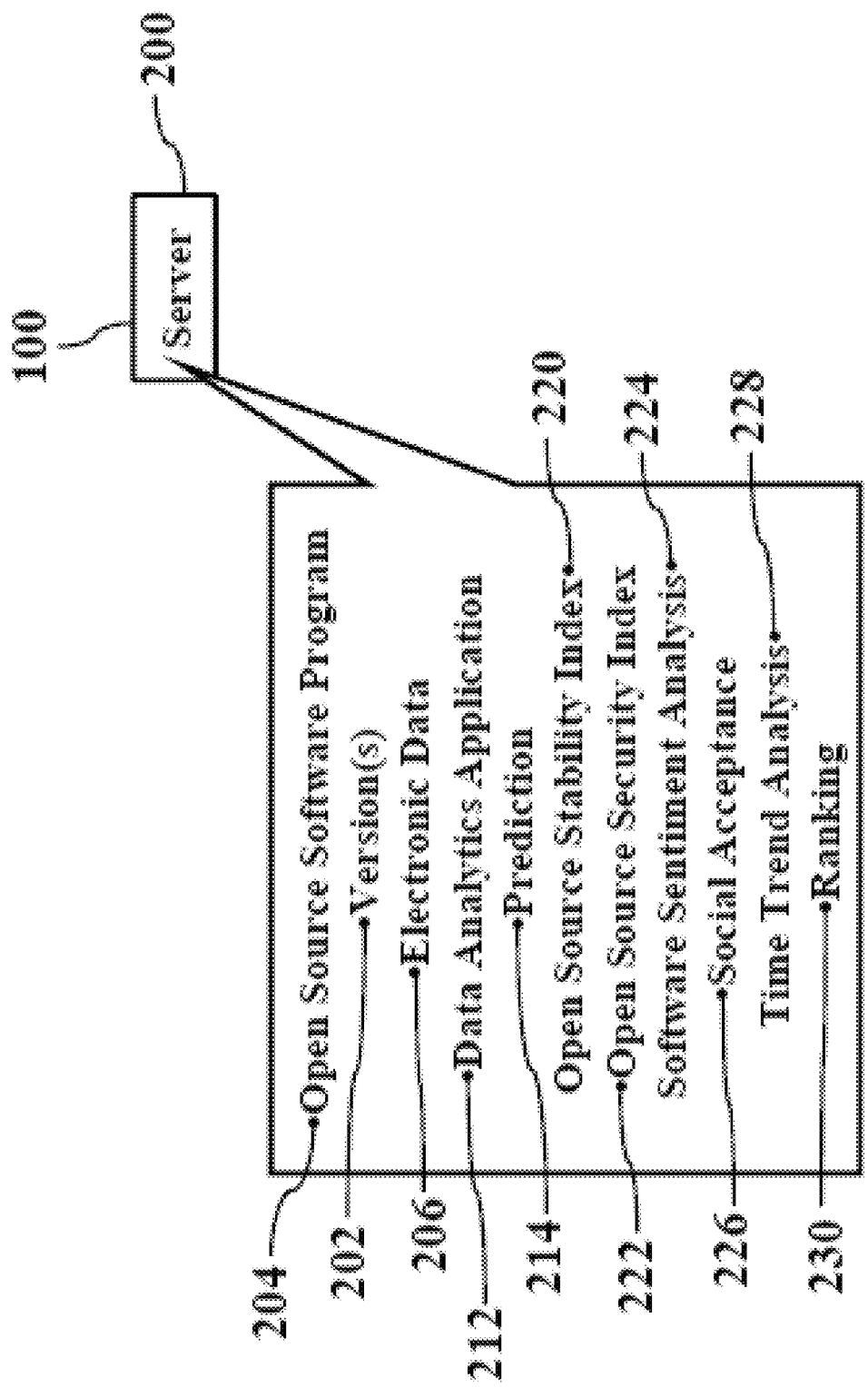

FIGS. 2-3 are simplified illustrations of open source evaluations, according to exemplary embodiments. Here the information handling system 100 is illustrated as a server 200 that evaluates different versions 202 of an open source software program 204. As the reader may understand, there may be many different versions 202 of the open source software program 204, and each different version 202 may have a different performance, problems or "bugs," patches or other fixes, and other issues. The server 200 gathers electronic data 206 from one or more sources 208 (such as a database 210). The electronic data 206 is related to, associated with, or describes, the different versions 202 of the open source software program 204. The server 200 executes a data analytics application 212 that retrieves the electronic data 206 and generates a prediction 214. The prediction 214 predicts which one or more of the different versions 202 of the open source software program 204 is most or best stable and secure. Because there may be many different versions 202 of the open source software program 204, exemplary embodiments predict which particular one(s) of the versions 202 is/are most deserving of limited development resources and investment.

FIG. 3 further illustrates the prediction 214. The prediction 214 may be based on many factors or parameters. For example, the server 200 may use the electronic data 206 to generate an open source stability index 220. The open source stability index 220 is a probability, measure, number, or parameter that describes how a particular version 202 behaves based on reported defects (which later paragraphs will explain). The server 200 may also use the electronic data 206 to generate an open source security index 222. The open source security index 222 is a probability, measure, number, or parameter that describes reported security issues for particular one of the versions 202 (which later paragraphs will explain). The server 200 may also use the electronic data 206 to perform or generate a software sentiment analysis 224. The software sentiment analysis 224 determines a social acceptance 226 of any version 202 of the open source software program 204 (which later paragraphs will explain). The server 200 may use the electronic data 206 to perform or generate a time trend analysis 228 that determines the most stable version 202, perhaps measured according to time or version number. The server 200, executing the data analytics application 212, may then generate a ranking 230 of the different versions 202 of the open source software program 204, perhaps based on the open source stability index 220, the open source security index 222, the software sentiment analysis 224, and/or the time trend analysis 228. Exemplary embodiments may then use the ranking 230 to generate the prediction 214 of which version 202 of the open source software program 204 is most deserving of further development and investment.

Figure 4:
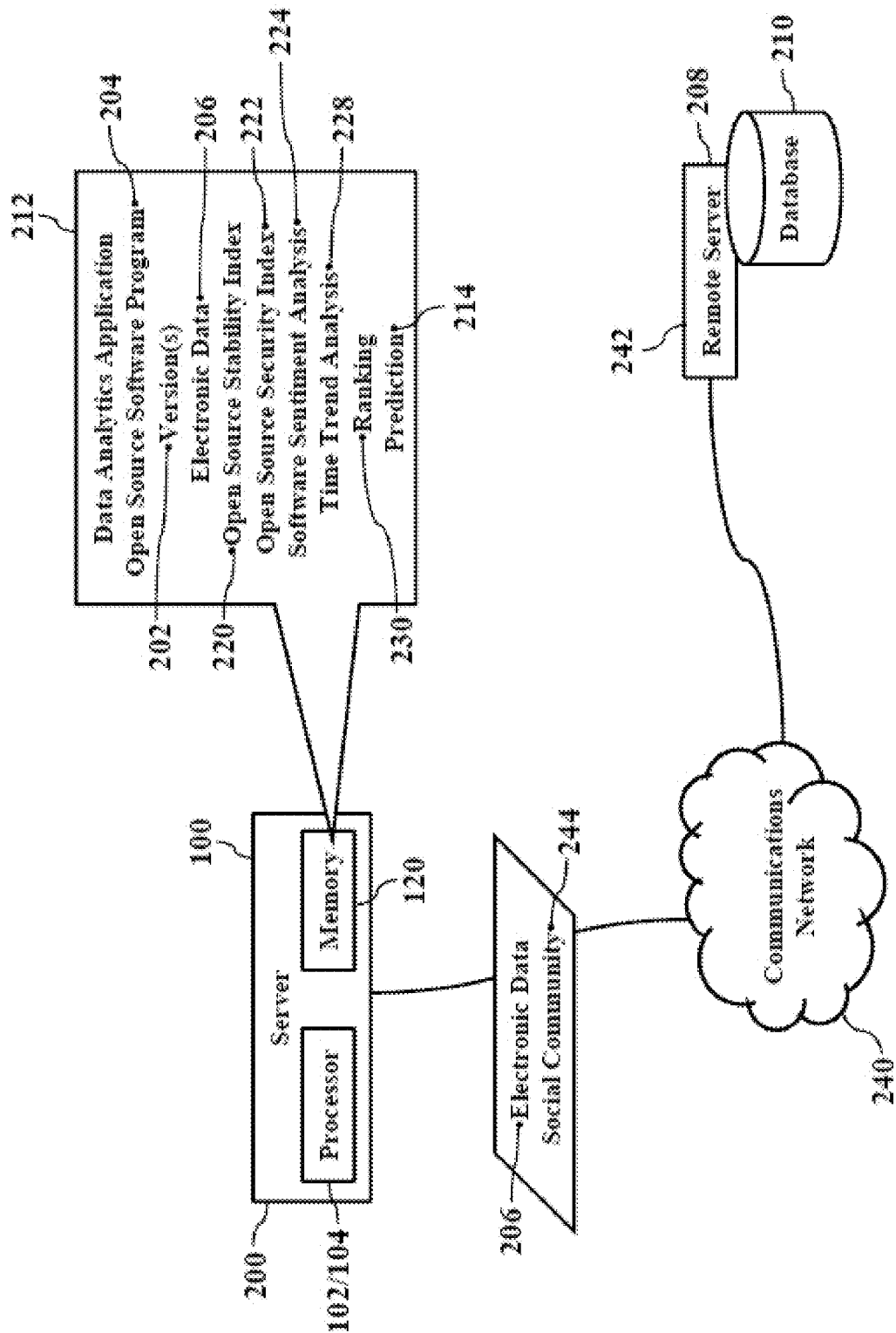
FIG. 4 illustrates an architecture for ranking different versions of an open source software program, according to exemplary embodiments.

FIG. 4 illustrates an architecture for the ranking 230 of the different versions 202 of the open source software program 204, according to exemplary embodiments. The information handling system 100 (again illustrated as the server 200) has the processor 102/104 that executes the data analytics application 212 stored in the memory device 120. The data analytics application 212 comprises software code or instructions that cause the processor 102/104 to perform operations, such as querying the data source 208 to retrieve or collect the electronic data 206. For example, the server 200 communicates via a communications network 240 with one or more remote servers 242 that store or maintain the electronic data 206 in the electronic database 210. While there may be many remote servers 242 storing different databases 210 and different electronic data 206, FIG. 4 only illustrates a simple query and response mechanism for the single remote server 242 storing the single electronic data 206.

The electronic data 206 may include any information related to the different versions 202 of the open source software program 204. The remote server 200, for example, may store and/or maintain detailed information about any open source product that is available for use and/or evaluation by a social community 244 of users. The electronic database 210 may arrange any open source product information according to each different version 202 and its respective documentation. The electronic data 206 may describe defects or bugs related to each version 202 of the open source software program 204. The electronic data 206 may include time driven information, such as how often (in time) that any version 202 was updated and how much time was needed to get stabilized per version 202. The data analytics application 212 may thus use any of the electronic data 206 to generate the open source stability index 220 and/or the open source security index 222. The data analytics application 212 may use any of the electronic data 206 to generate or perform the software sentiment analysis 224 and/or the time trend analysis 228. The data analytics application 212 may then generate the ranking 230 of the different versions 202 of the open source software program 204 and generate the prediction 214 of which version 202 is most deserving of further development and investment. Exemplary embodiments thus help development personnel and management to select the stabilized version 202 best suited for further development.

The data analytics application 212 may act as a data collector for the electronic data 206. The remote server 200 stores any information related to the different versions 202 of the open source software program 204. The data analytics application 212 may query and retrieve any of the electronic data 206 according to a periodic or random time schedule or interval. The data analytics application 212 may even outsource some of the electronic data 206 for a subcontractor or supplier process and receive a processing result. The data analytics application 212 may perform an index evaluation that calculates data trends and provides stability prediction models. The data analytics application 212 may then generate a report or summary for any version 202 of the open source software program 204.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When the server 200 communicates via the communications network 240 with the remote server 242, the electronic data 206 may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 5:
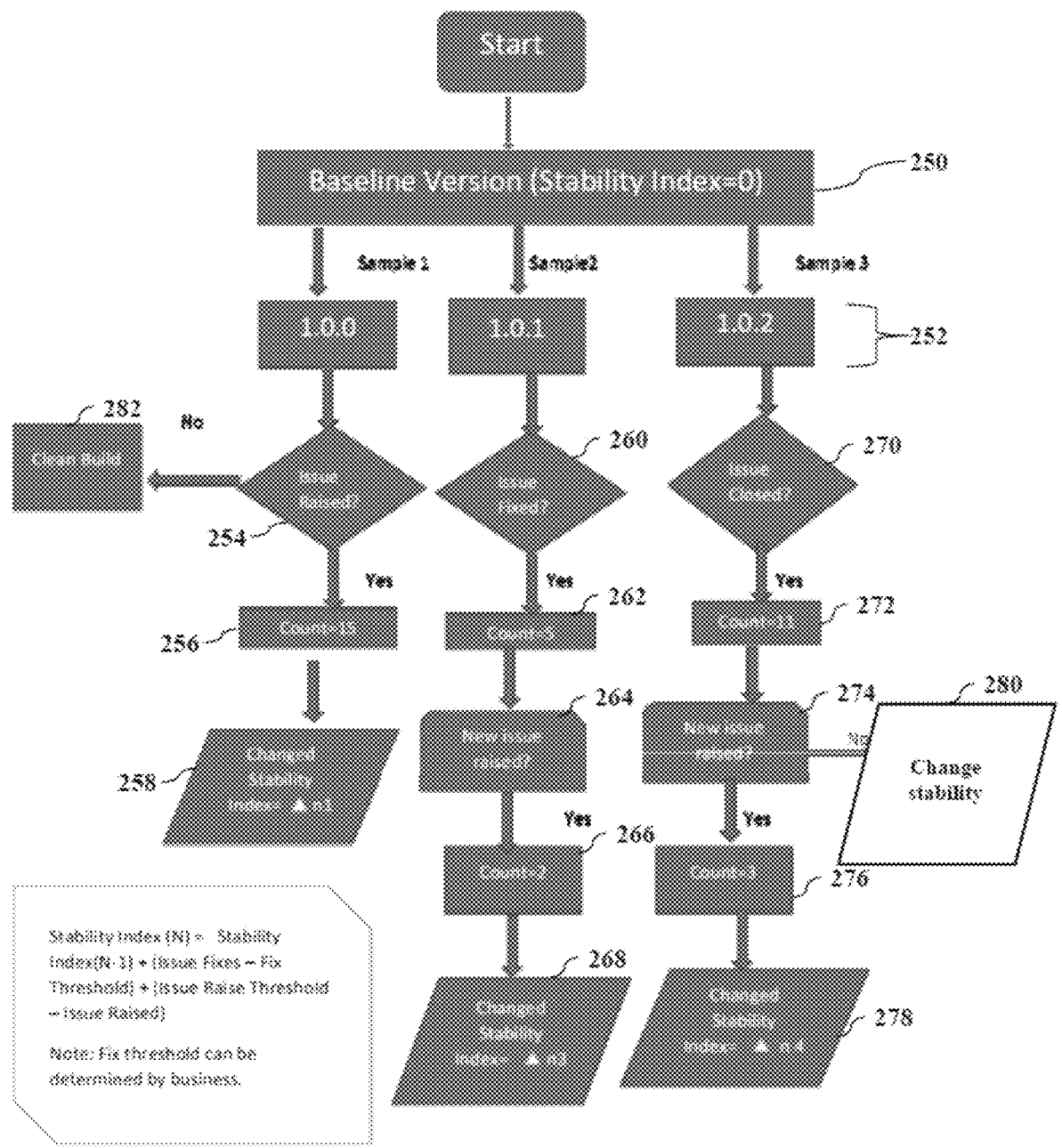
FIG. 5 is a detailed illustration of an open source stability index, according to exemplary embodiments.

FIG. 5 is a more detailed illustration of the open source stability index 220, according to exemplary embodiments. FIG. 5, in particular, is a flowchart illustrating a method or algorithm for calculating the open source stability index 220. The open source stability index 220 is a probability, measure, number, or parameter that describes how a particular version 202 behaves based on reported defects. For example, the open source software program 204 may be launched as "version 1.0" and assigned an initial value of the open source stability index 220 (Block 250). The initial value will likely have a low value for the open source stability index 220, as the initial version 1.0 has little or no proven data of stability. The data source 208 is periodically or randomly sampled to obtain the electronic data 206 associated with each version 202 (Block 252). The data analytics application 212 may nearly continuously or periodically re-evaluate the open source stability index 220 according to algorithmic steps. Each open source distribution has a release index (e.g., perhaps as revealed by the social open source platform github (which may be accessed via https://github.com/lathiat/avahi/blob/master/docs/NEWS).

Issues may be iteratively or recursively tracked. For example, if any version 202 has an issue raised (Block 254), a count of the issues raised is incremented (Block 256) and the open source stability index 220 is changed (Block 258). If the issue is fixed (Block 260), the open source stability index 220 may again change (Block 262) and exemplary embodiments may again canvass the electronic data 206 for a new issue raised (Block 264). The count of the issues raised is incremented (Block 266) and the open source stability index 220 is changed (Block 268). If the issue is closed (Block 270), a count of the issues closed is incremented (Block 272) and exemplary embodiments may again canvass the electronic data 206 for a new issue raised (Block 274), increment the count (Block 276), and change the open source stability index 220 (Block 278). If no new issue is determined (Block 274), then the open source stability index 220 is changed (Block 280). Moreover, if no issue is raised (Block 254), then exemplary embodiments may infer that the version 202 is clean and adequately performing within the social community 244 (Block 282).

The data analytics application 212 may use the version releases to create a stability model. The version 1.0.0 will have the open source stability index 220 of zero (0), implying version 1.0.0 has the highest probability of being unstable. For each minor release (e.g., version 1.2.1), the open source stability index 220 will likely improve based on the following factors:

a) the recent minor release will have a higher open source stability index 220 (this is applicable when the reference point is different than any 1.0 release);

b) issue reported in N-m releases issue vs. issue fixed per release:
  i. issues raised on 1.0.0 was 15,
  ii. issues fixed on 1.0.1 was 5,
  iii. new issues raised on 1.0.1 was 2,
  iv. open issues 15−5+2=12, v. issues fixed on 1.1.0 was 11, vi. new issues opened on 1.1.0 was 3, and vii. open issues=4;

c) from the above we can see how the open source stability index 220 is rising per version change;

d) from the electronic data 206 we collect an issue fix statistical range and new issue raise statistical range. These two ranges provide the average issue fixes per minor releases vs. the number of new issues. Depending on the factors, a threshold may be created or implemented. If the number of issue fixes in the current version is greater than the threshold, the open source stability index 220 will be increased. Similarly depending upon the new issues raised, the open source stability index 220 will be modified. As more issues are raised, the lesser the open source stability index 220:

Stability Index (*N*)=Stability Index (*N*−1)+(Issue fixes−Fix Threshold)+(Issue Raise Threshold− Issue Raised);

e) the electronic data 206 may depend on time as well as new issues can be raised. The statistical threshold will also change over time starting from 0;

f) with this electronic data 206 we will have a data across the versions 202 on how the open source stability index 220 has improved or decreased);

g) for any major version number change (e.g., version 2.0.0), the open source stability index 220 will be halved as there is a higher probability of issues.

Figure 6:
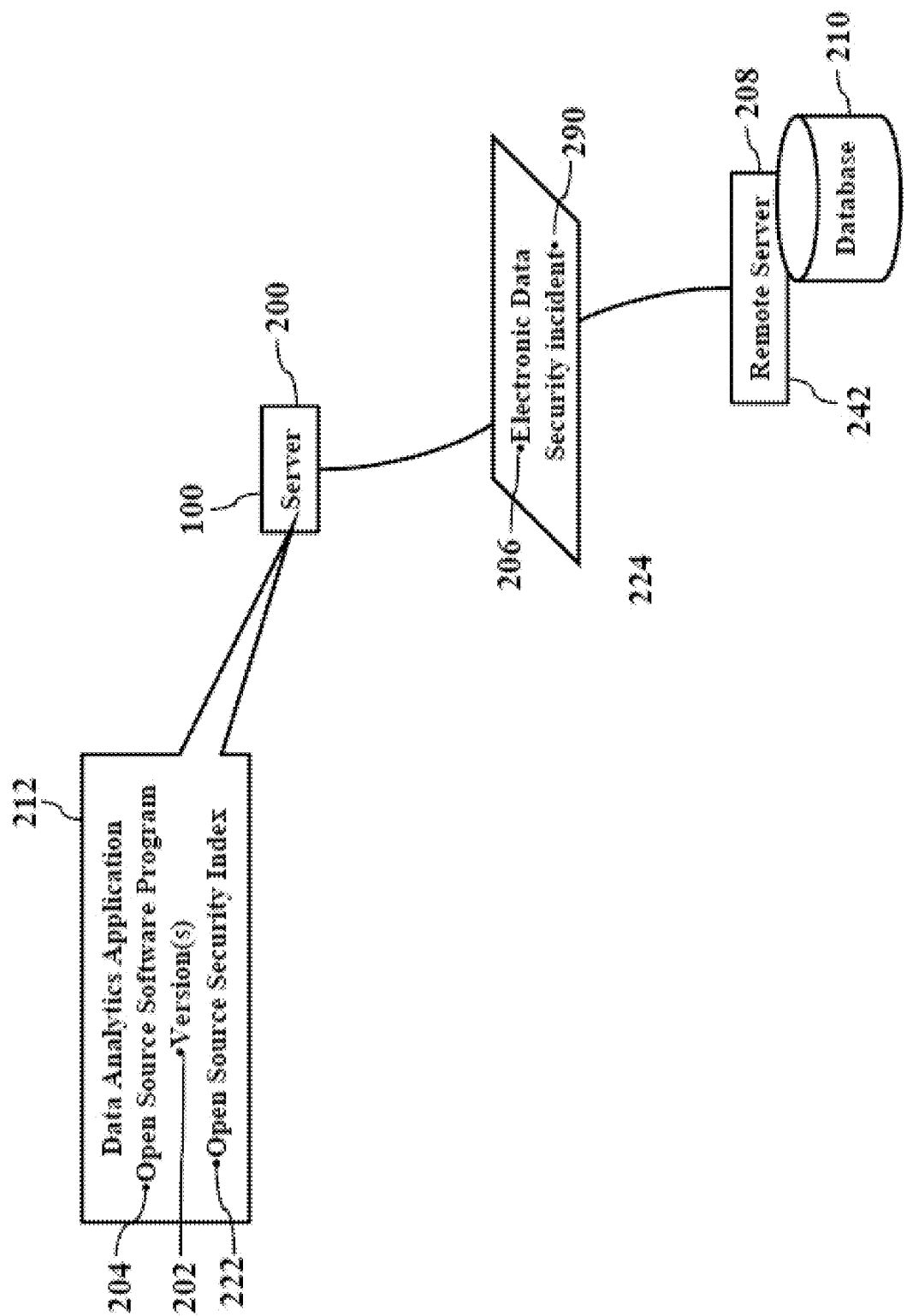
FIG. 6 is a detailed illustration of an open source security index, according to exemplary embodiments.

FIG. 6 is a detailed illustration of the open source security index 222, according to exemplary embodiments. The open source security index 222 is a probability, measure, number, or parameter that describes reported security issues for particular one of the versions 202. The open source security index 222 may be calculated based on security incidents 290 reported on one or more vulnerabilities websites. The open source security index 222 may be calculated based on a) a number of security issues per version release and/or b) criticality of issues (e.g., CVSS scores perhaps as reported by https://www.first.org/cvss/). The open source security index 222 may be volatile parameter and may require periodic or continuous monitoring of incident databases 210. When a security issue is reported, based on the criticality of the issue, the open source security index 222 will be reduced. If a new version 202 is released, the open source security index 222 will be revised. As an example, the open source security index 222 may start at a value of one hundred (100) and, if any issues are reported, the open source security index 222 associated with that particular version will be changed. An administrator or user of the data analytics application 212 may dynamically add or remove data sources for open source scanning.

Figure 7:
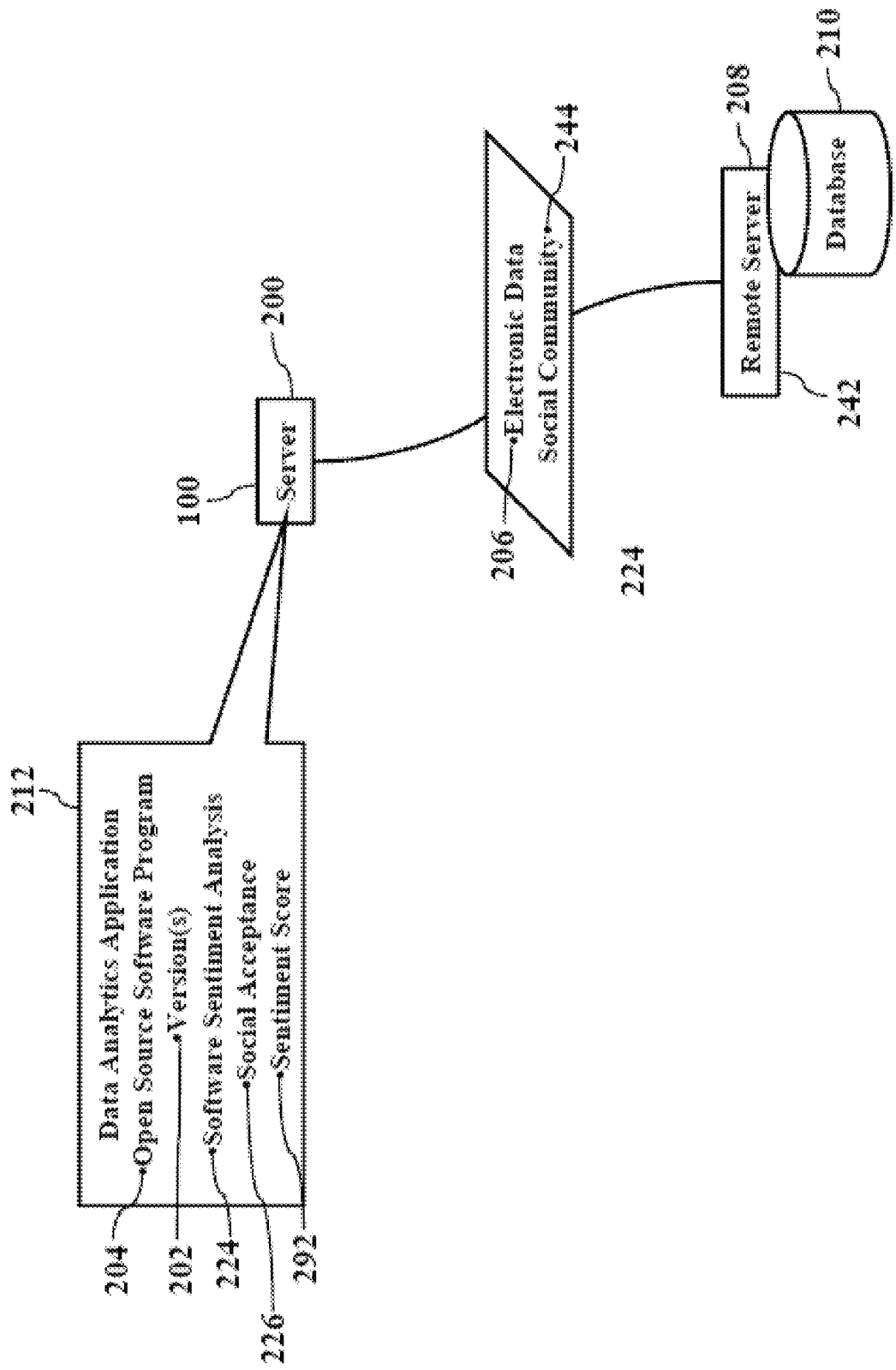
FIG. 7 is a detailed illustration of a software sentiment analysis, according to exemplary embodiments.

FIG. 7 is a detailed illustration of the software sentiment analysis 224, according to exemplary embodiments. The software sentiment analysis 224 determines the social acceptance 226 of any version 202 of the open source software program 204. Once the electronic data 206 is available from any source, the data analytics application 212 may generate the software sentiment analysis 224 to understand the social acceptance 226 of the open source software program 204 by the social community 244. The software sentiment analysis 224 mines the electronic data 206 to learn or discern user opinions using natural language processing, text analysis, computational linguistics, and perhaps even biometrics to systematically identify, extract, quantify, and study affective states and subjective information. The software sentiment analysis 224, for example, may generate a numerical sentiment score 292 representing the social acceptance 226. For example, the social acceptance 226 and/or the sentiment score 292 may include a term tokenization that derives the social acceptance 226 (perhaps as vector components of a +ve or −ve sentiment) based on the textual terms that are being used in the social community 244 to describe any version 202 of the open source software program 204. Numbers or quantities of key phrase matching, for example, may be used to determine or influence the social acceptance 226. The software sentiment analysis 224 may measure a fulfillment quotient that describes "like" or other voting options entered by users in the social community 244 to describe any version 202 of the open source software program 204. The software sentiment analysis 224 may thus collect and tally or sum the particular votes (such as likes or dislikes) for each version 202, perhaps among total number of views or users.

The software sentiment analysis 224 may also generate a community inclination describing which version 202 is being executed, used, or consumed by a greater number of the users within the social community 244. Exemplary embodiments may thus generate a social preference within the social community 244 describing numerical counts of the downloads for each version 202 and any relevant demographic spreads regarding the users, geography, chassis model, software inventory, and/or hardware inventory. The social preference may thus reveal which version 202 subjectively performs best within the social community 244, perhaps according to machine and installed software.

The software sentiment analysis 224 may also generate a usage array. The usage array determines how often any version 202 of the open source software program 204 is being updated and what are the number of downloads for the different versions 202 of the open source software program 204. For example, the software sentiment analysis 224 may determine when was the last time any version 202 of the open source software program 204 was updated.

Figure 8:
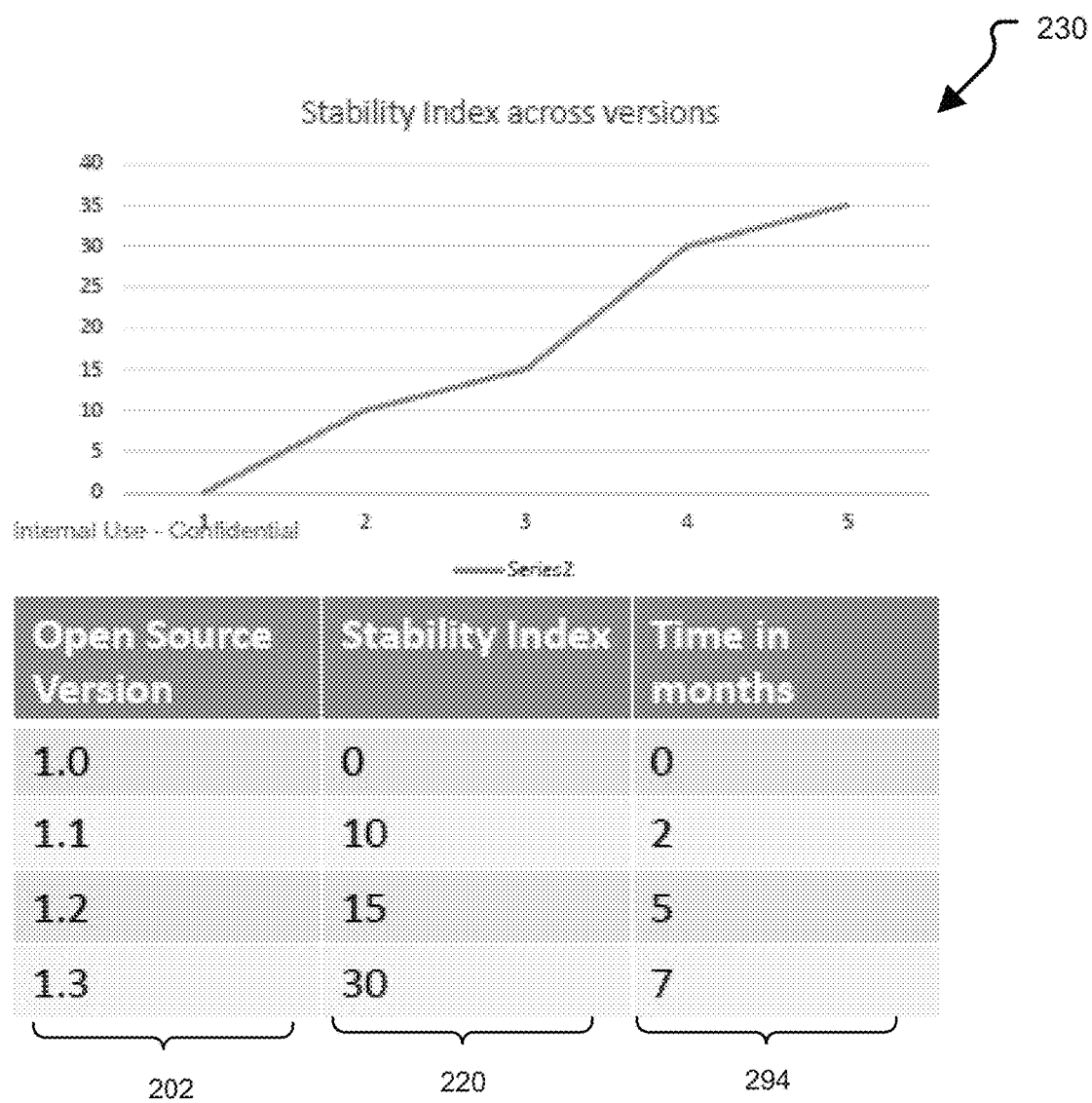
FIG. 8 is a detailed illustration of a time trend analysis, according to exemplary embodiments.

FIG. 8 is a more detailed illustration of the time trend analysis 228, according to exemplary embodiments. The time trend analysis 228 determines the most stable version 202 of the open source software program 204 (as FIGS. 2-4 & 6-7 illustrated), perhaps measured according to time or version number. The data analytics application 212 (illustrated in FIG. 7) may report the time trend analysis 228 as an output for display by a display device (not shown for simplicity). As FIG. 8 illustrates, the time trend analysis 228 may be presented as a graphical table and/or a graphical plot (such as within a graphical user interface) that maps, relates, or associates each different version 202 to its corresponding open source stability index 220 and to its corresponding time 294 to acceptable stability. Exemplary embodiments analyze and present how much time (such as days or months) required for a particular generational version 202 to get stabilized. Exemplary embodiments may thus visualize the trend of stable usage of each version 202. The time trend analysis 228 may thus identify the most stable version 202 of the open source software program 204 and using that most stable version 202 for further development activities. Exemplary embodiments may thus predict the probability of the stability of the distribution in months or in version number. Again, as with any predictive model, the larger the data set, the prediction model fairs better.

FIG. 9 further illustrates the ranking 230, according to exemplary embodiments. The server 200, executing the data analytics application 212 (as explained with reference to FIG. 4), may generate the ranking 230 of the different versions 202 of the open source software program 204.

While the ranking 230 may have any presentation, FIG. 9 illustrates a graphical table (such as within a graphical user interface) that maps, relates, or associates each different version 202 to its corresponding open source stability index 220, open source security index 222, time trend analysis 228, and software sentiment analysis 224. Each version 202 may further have a corresponding name 296 or product identifier 298 for easier reference, along with a deployment model 300 describing how the particular version 202 is deployed in the field. Even though exemplary embodiments evaluate open source software, each version 202 may have a licensing scheme 302. Exemplary embodiments may then use the ranking 230 to generate the prediction 214 of which version 202 of the open source software program 204 is most deserving of further development and investment.

The software sentiment analysis 224 is preferable simply to understand and compare. Even though the software sentiment analysis 224 may have any numerical value, FIG. 9 illustrates a simple sentiment scale or score of negative ten (−10) to positive ten (+10). The value of the software sentiment analysis 224 is defined based on the electronic data 206 observed and/or retrieved from the online social communities 244.

Exemplary embodiments thus determine the best possible open source reference model for any further development purpose. It is important for an organization to reference a stable and secure version of open source product to ensure that it is developing on a reliable platform. Moreover, the stable and secure version also ensures its customers are having a better experience while using that open source product. Exemplary embodiments may analyze the electronic data 206 associated with any open source software program 204. Exemplary embodiments may analyze its different versions 202, analyze defect counts among every version 202, and analyze critical bugs reported for each generation of the open source software program 204. Exemplary embodiments may analyze the time taken by each generation to get stabilized, the adoption rate for each version 202, and what is the future/scope of a specific version 202. Exemplary embodiments thus decide the most stabilized version that suits a business requirement.

Exemplary embodiments use predictive analysis to consume the electronic data 206 in the favor of a business strategy. Exemplary embodiments reduce the project time spent on information gathering and provide the predictive analysis report that helps management to take the right decision to choose the open source product for further development. Exemplary embodiments identify the most or preferred stable version 202, based perhaps in part on stability, security, and adoption rate of the different versions 202 of the open source software program 204.

The social community 244 reflects today's open source social networking. Software users, software developers, and businesses are establishing and using social networking to discuss and to document open source programming efforts. For example, https://github.com is an online development platform that allows users to post, host, and/or review open source code, manage projects, and build software alongside millions of other developers. Exemplary embodiments may collect the electronic data 206 from the social community 244 (such as https://github.com) perhaps using keyword searches. Moreover, other social communities 244, such as Twitter®, LinkedIn®, and other social media platforms, may be queried (perhaps again using keyword searches) to gather the electronic data 206 regarding open source documentation, comments, and other usage information. The electronic data 206 may be matched and analyzed according to the different versions 202 of the of the open source software program 204. Simply put, the electronic data 206 from these social communities 244 can be a measure of performance, based on consumption tends (including defects, fixes, and critical bugs) that are reported by users of the different versions 202 of the of the open source software program 204. The electronic data 206 may thus define the scope for further release and guide developers with the areas of improvements.

Even non-contributors may benefit. Even if a user, team, or company does not utilize or contribute reviews and comments to the open source social community 244, the electronic data 206 may still be worthwhile and even valuable. In-house products and developers, for example, may still wish to know the trends of a particular version 202 of the of the open source software program 204 to determine its stability for further design efforts. Exemplary embodiments may thus reveal whether a feature loaded build, perhaps with lots of critical bugs, should be used or purchased. or whether a stable build with minimum low priority defects should be preferred. When the consumer company is not owning the open source software program 204, exemplary embodiments help identify and/or adapt to a model providing predictive analysis.

Exemplary embodiments thus utilize predictive analysis to consume the electronic data 206 in the favor of a business strategy. Conventional techniques involve a huge amount of manual effort, requiring actual run-time evaluations of all the versions 202 of the open source software program 204 before selecting a specific one of the versions 202 for further development. Exemplary embodiments, instead, reduce the project time spent on information gathering and use the predictive analysis to select the most deserving version 202 for further development. By performing the time trend analysis 228, exemplary embodiments identify the stable version 202 for further development that is suitable for a desired business strategy. Exemplary embodiments provide the adoption rate of the different versions 202 of the of the open source software program 204. Indeed, exemplary embodiments may capture the electronic data 206 submitted by competitors who are using the same open source software program 204.

Figure 10:
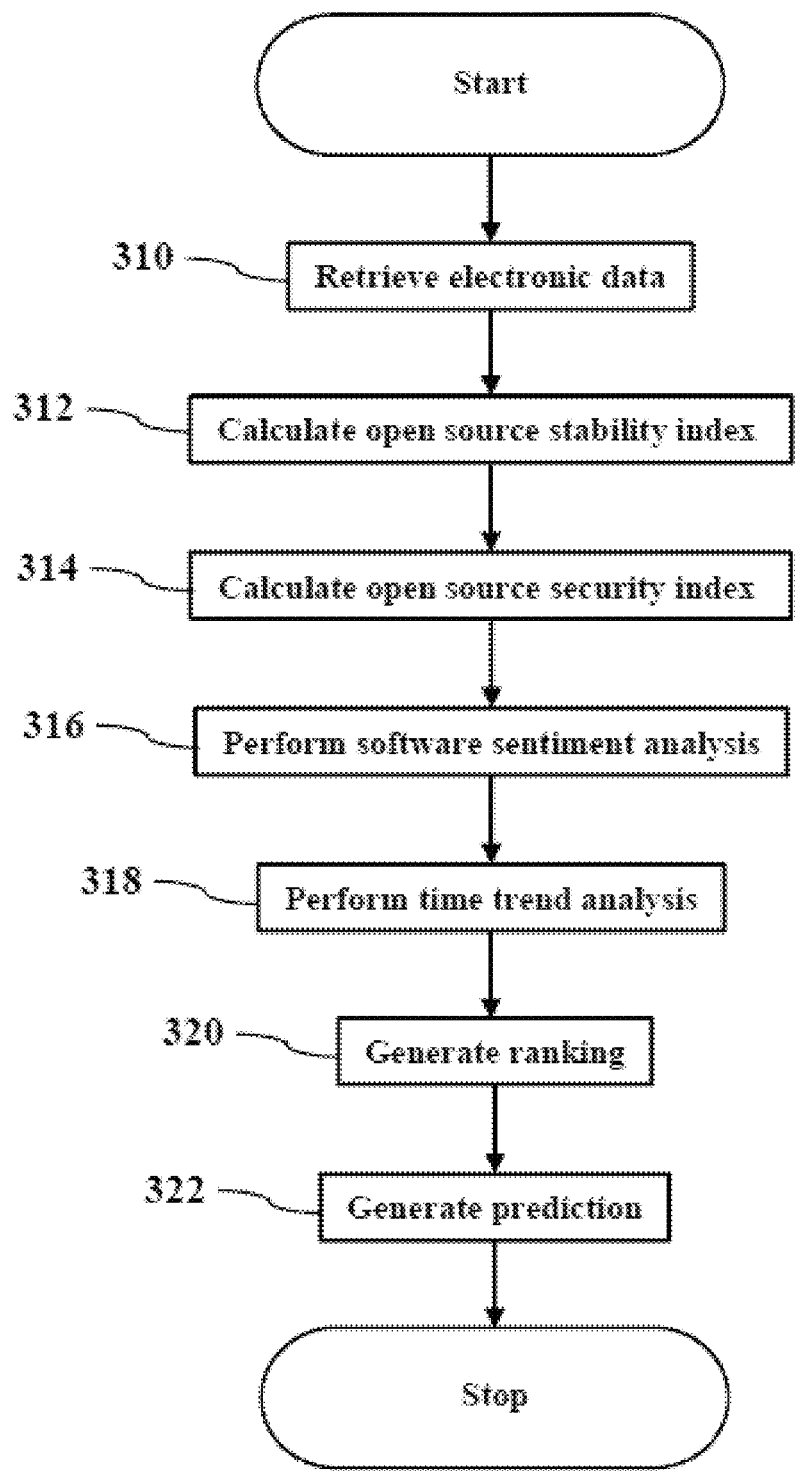
FIG. 10 is a flowchart illustrating a method or algorithm for open source evaluations, according to exemplary embodiments.

FIG. 10 is a flowchart illustrating a method or algorithm for open source evaluations, according to exemplary embodiments. The electronic data 206 is retrieved (Block 310) for the version 202 of the open source software program 204. The open source stability index 220 is calculated (Block 312) and the open source security index 222 is calculated (Block 314). The software sentiment analysis 224 is performed to determine the social acceptance 226 (Block 316) of any version 202 of the open source software program 204. The time trend analysis 228 is performed (Block 318) and the ranking 230 is generated (Block 320). The prediction 214 is generated (Block 322) to identify which version 202 of the open source software program 204 is most deserving of further development and investment. While the prediction 214 may be based on any logical rule or expression describing some objective or strategy, a simple example would be to predict the highest ranking version 202 is most deserving of further development and investment.

Exemplary embodiments may utilize a baseboard management controller. As those of ordinary skill in the art understand, the baseboard management controller has its own management processor and memory device (not shown for simplicity) that interfaces with a motherboard to provide side-band and out-of-band remote management (perhaps according to the Intelligent Platform Management Interface specification). The baseboard management controller has one or more physical communications links and interfaces to the motherboard, thus allowing the baseboard management controller to process messages according to the IPMI specification. The baseboard management controller may thus monitor and remotely report the functions and performance of the information handling system 100 via a separate network interface to the communications network 240. The baseboard management controller may thus collect any of the electronic data 206 and perform the methods or algorithm of FIG. 10. The baseboard management controller, for example, may capture and report any of the electronic data 206 during execution of a boot operation. The baseboard management controller may generate a hardware and software inventory of its installed chassis, thus revealing detailed electronic data 206 describing peripheral components and software components associated with any executed version 202 of the open source software program 204. This detailed hardware and software inventory helps identify and differentiate the performance differences between the versions 202.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of ranking a version of an open source software program, the method comprising:
   querying, by an information handling system, a data source to retrieve electronic data describing the version of the open source software program;
   generating, by the information handling system, an open source stability index based on the electronic data describing the version of the open source software program, wherein the open source stability changes based on a number of issues closed and based on a number of new issues raised in the version of the open source software program;
   performing, by the information handling system, a time trend analysis based on the electronic data describing the version of the open source software program, wherein the time trend analysis includes determining how often in time the version of the open source software program was updated and determining how much time was needed to get a stable version of the open source software program based on no issues remaining in the version of the open source software program;

generating, by the information handling system, an open source security index based on the electronic data describing the version of the open source software program; and generating, by the information handling system, the ranking of the version of the open source software program based on the open source stability index and on the open source security index.

2. The method of claim 1, further comprising assigning a numerical value to the open source stability index.

3. The method of claim 1, further comprising assigning a numerical value to the open source security index.

4. The method of claim 1, further comprising keyword matching the electronic data to the version of the open source software program.

5. The method of claim 1, further comprising performing a software sentiment analysis based on the electronic data describing the version of the open source software program.

6. The method of claim 5, further comprising generating the ranking of the version of the open source software program based on the software sentiment analysis.

7. The method of claim 1, further comprising generating the ranking of the version of the open source software program based on the time trend analysis.

8. A system, comprising:
a hardware processor; and
a memory device accessible to the hardware processor, the memory device storing instructions, the instructions when executed causing the hardware processor to perform operations, the operations including:
  querying a data source to retrieve electronic data describing a version of an open source software program;
  generating an open source stability index based on the electronic data describing the version of the open source software program, wherein the open source stability changes based on a number of issues closed and based on a number of new issues raised in the version of the open source software program;
  performing a time trend analysis based on the electronic data describing the version of the open source software program, wherein the time trend analysis includes determining how often in time the version of the open source software program was updated and determining how much time was needed to get a stable version of the open source software program based on no issues remaining in the version of the open source software program;
  generating an open source security index based on the electronic data describing the version of the open source software program; and
  generating a ranking of the version of the open source software program based on the open source stability index and on the open source security index.

9. The system of claim 8, wherein the operations further include assigning a numerical value to the open source stability index.

10. The system of claim 8, wherein the operations further include assigning a numerical value to the open source security index.

11. The system of claim 8, wherein the operations further include keyword matching the electronic data to the version of the open source software program.

12. The system of claim 8, wherein the operations further include performing a software sentiment analysis based on the electronic data describing the version of the open source software program.

13. The system of claim 12, wherein the operations further include generating the ranking of the version of the open source software program based on the software sentiment analysis.

14. The system of claim 1, wherein the operations further include generating the ranking of the version of the open source software program based on the time trend analysis.

15. A memory device storing instructions that when executed cause a hardware processor to perform operations, the operations comprising:
  querying a data source to retrieve electronic data describing a version of an open source software program;
  generating an open source stability index based on the electronic data describing the version, wherein the open source stability changes based on a number of issues closed and based on a number of new issues raised in the version of the open source software program;
  performing a time trend analysis based on the electronic data describing the version of the open source software program, wherein the time trend analysis includes determining how often in time the version of the open source software program was updated and determining how much time was needed to get a stable version of the open source software program based on no issues remaining in the version of the open source software program;
  generating an open source security index based on the electronic data describing the version; and
  generating a ranking of the version of the open source software program based on the open source stability index and on the open source security index.

16. The memory device of claim 15, wherein the operations further include performing a software sentiment analysis based on the electronic data describing the version of the open source software program.

17. The memory device of claim 16, wherein the operations further include generating the ranking of the version of the open source software program based on the software sentiment analysis.

18. The memory device of claim 16, wherein the operations further include:
  generating the ranking of the version of the open source software program based on the time trend analysis.

* * * * *